(12) United States Patent
Sridharan et al.

(10) Patent No.: US 11,778,569 B2
(45) Date of Patent: Oct. 3, 2023

(54) PHYSICAL UPLINK SHARED CHANNEL (PUSCH) POWER SCALING FACTOR REPORTING

(71) Applicant: QUALCOMM Incorporated, San Diego, CA (US)

(72) Inventors: Gokul Sridharan, Sunnyvale, CA (US); Yi Huang, San Diego, CA (US); Wei Yang, San Diego, CA (US); Xiao Feng Wang, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/747,333

(22) Filed: Jan. 20, 2020

(65) Prior Publication Data

US 2020/0236634 A1    Jul. 23, 2020

Related U.S. Application Data

(60) Provisional application No. 62/794,972, filed on Jan. 21, 2019.

(51) Int. Cl.
*H04W 52/36* (2009.01)
*H04W 52/34* (2009.01)

(52) U.S. Cl.
CPC ......... *H04W 52/367* (2013.01); *H04W 52/34* (2013.01); *H04W 52/365* (2013.01)

(58) Field of Classification Search
CPC .. H04W 52/367; H04W 52/34; H04W 52/365
See application file for complete search history.

(56) References Cited

U.S. PATENT DOCUMENTS

| | | | |
|---|---|---|---|
| 2011/0275335 A1* | 11/2011 | Luo ..................... | H04W 52/281 455/127.1 |
| 2012/0115534 A1* | 5/2012 | Luo ..................... | H04W 52/286 455/522 |
| 2013/0215811 A1* | 8/2013 | Takaoka ............ | H04W 28/0268 370/311 |
| 2014/0254639 A1* | 9/2014 | Tahir .................... | H04B 7/0426 375/267 |
| 2015/0163680 A1* | 6/2015 | Valliappan ............ | H04L 5/0073 370/329 |
| 2015/0223178 A1* | 8/2015 | Pietraski ............. | H04W 52/325 370/252 |
| 2020/0187134 A1* | 6/2020 | Noh ...................... | H04W 52/42 |

OTHER PUBLICATIONS

International Search Report and Written Opinion—PCT/US2020/014367—ISA/EPO—dated Apr. 29, 2020.

* cited by examiner

*Primary Examiner* — Yuwen Pan
*Assistant Examiner* — Angelica Perez
(74) *Attorney, Agent, or Firm* — Patterson & Sheridan, L.L.P.

(57) ABSTRACT

Certain aspects of the present disclosure provide techniques for scaling transmission power across transmit chains for physical uplink shared channel (PUSCH) transmissions.

30 Claims, 9 Drawing Sheets

| α | Power boost in dB |
|---|---|
| 00 | 0 dB |
| 01 | 1 dB |
| 10 | 2 dB |
| 11 | 3 dB |

FIG. 7

PHYSICAL UPLINK SHARED CHANNEL (PUSCH) POWER SCALING FACTOR REPORTING

PRIORITY CLAIM(S)

This application claims priority to and the benefit of U.S. Provisional Application No. 62/794,972, filed on Jan. 21, 2019 which is expressly incorporated by reference in its entirety as if fully set forth below and for all applicable purposes.

TECHNICAL FIELD

Aspects of the present disclosure relate to wireless communications, and more particularly, to techniques for scaling transmission power across transmit chains for physical uplink shared channel (PUSCH) transmissions.

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes determining a transmit power budget and an allocation of the transmit power budget across transmit chains for a scheduled physical uplink shared channel (PUSCH) transmission according to a power scaling factor, signaling an indication of the power scaling factor to a network entity that scheduled the PUSCH, and transmitting the PUSCH using the transmit chains according to the allocation of the transmit power budget.

Certain aspects provide a method for wireless communication by a network entity. The method generally includes scheduling physical uplink shared channel (PUSCH) transmissions from a user equipment (UE), receiving information indicating power scaling factors used by the UE to allocate transmit power budgets across transmit chains of the UE for the PUSCH transmission, and using the information to select one or more parameters for scheduling subsequent transmissions from the UE.

Certain aspects of the present disclosure also provide various apparatus, means, and computer readable media capable of (or having instructions stored thereon for) performing the operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 illustrates example power boosting parameter values, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
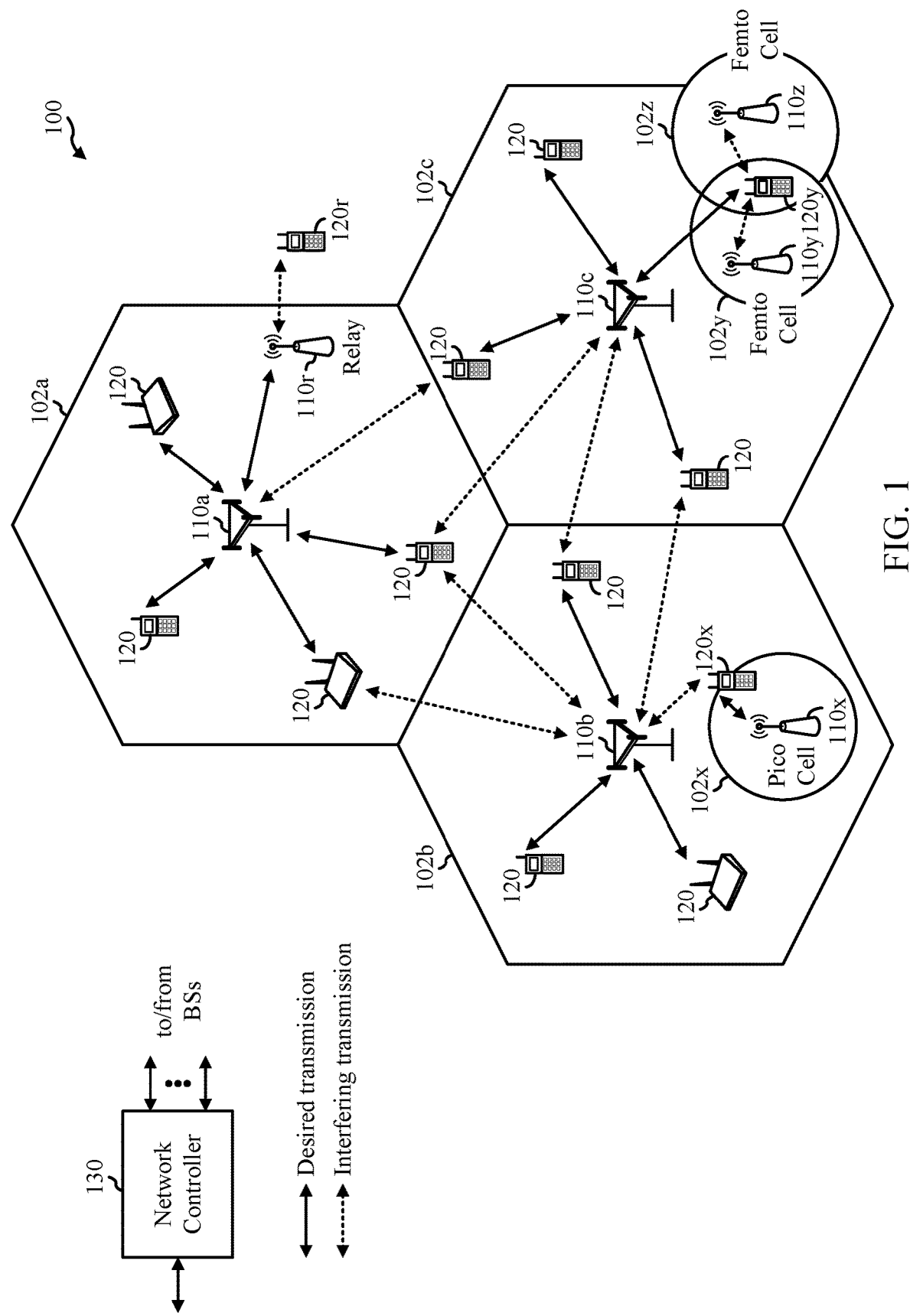
FIG. 1 is a block diagram conceptually illustrating an example telecommunications system, in accordance with certain aspects of the present disclosure.

Aspects of the present disclosure present disclosure provide apparatus, methods, processing systems, and computer readable mediums for scaling transmission power across transmit chains for physical uplink shared channel (PUSCH) transmissions.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless network 100 in which aspects of the present disclosure may be performed. For example, the wireless network 100 may include one or more UEs 120 configured to perform transmit power scaling according to operations 800 of FIG. 8 and one or more base stations 110 configured to perform operations 900 of FIG. 9 (to process transmissions from a UE 120 performing operations 800 of FIG. 8).

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things devices, which may be narrowband Internet-of-Things devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
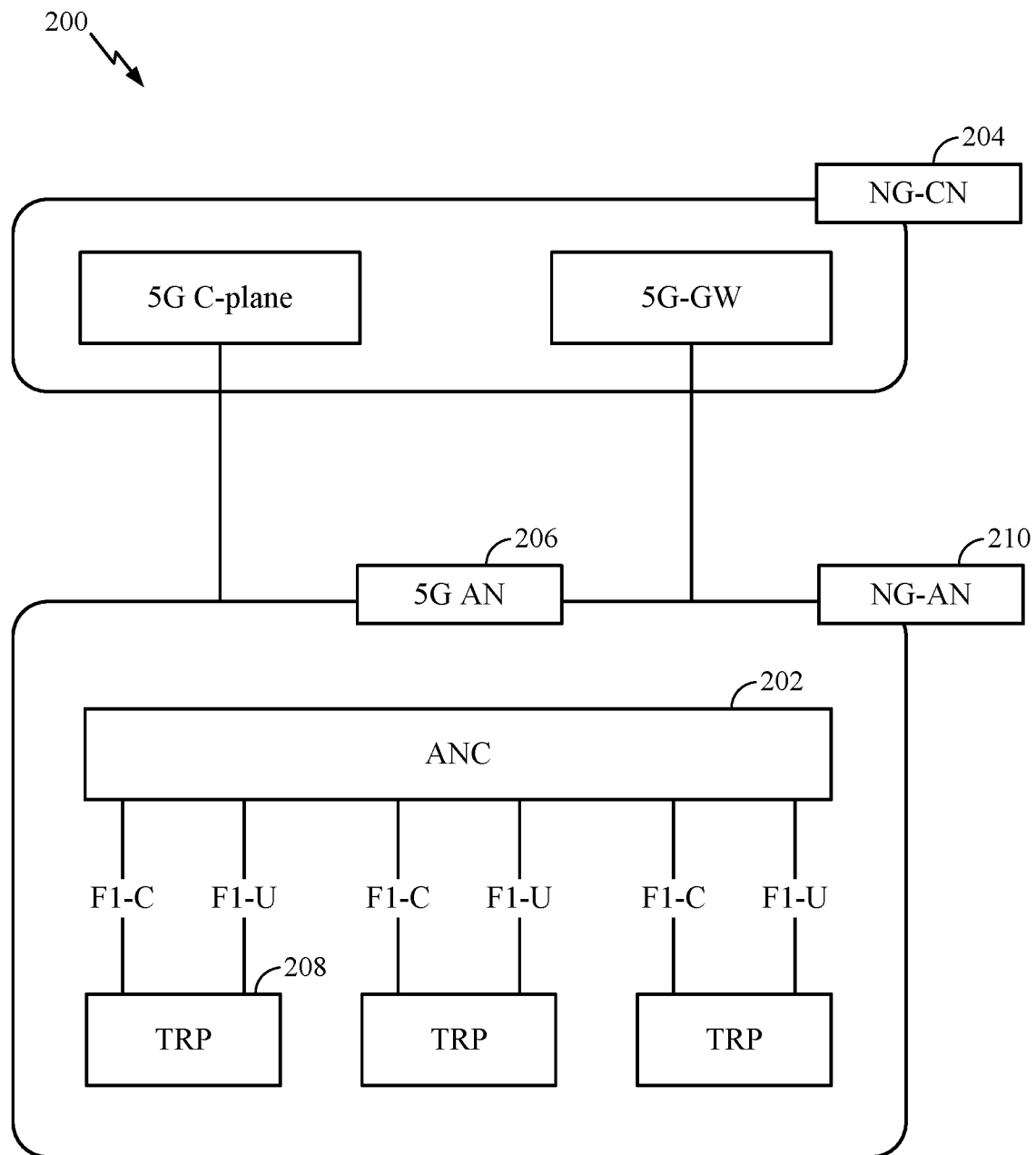
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
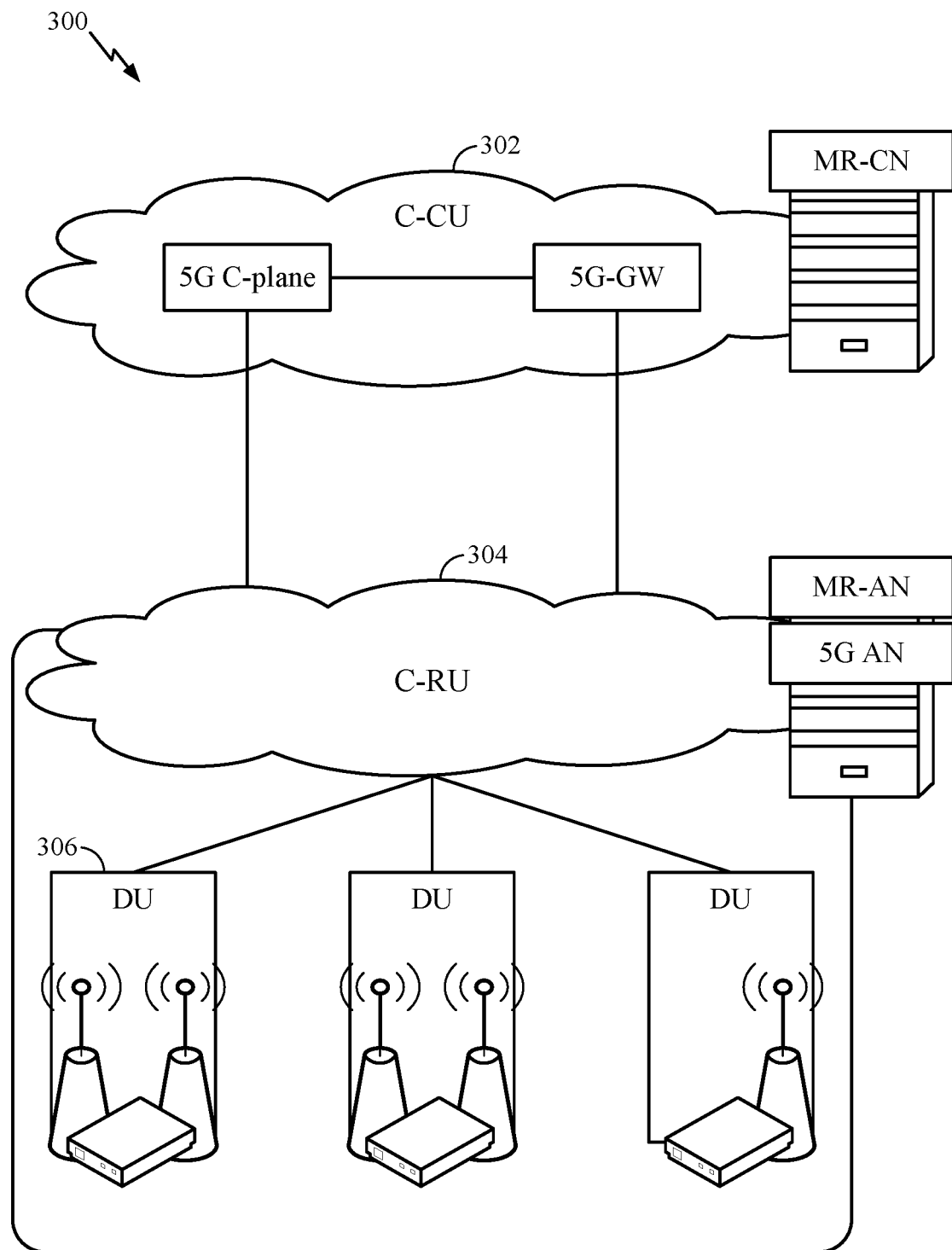
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
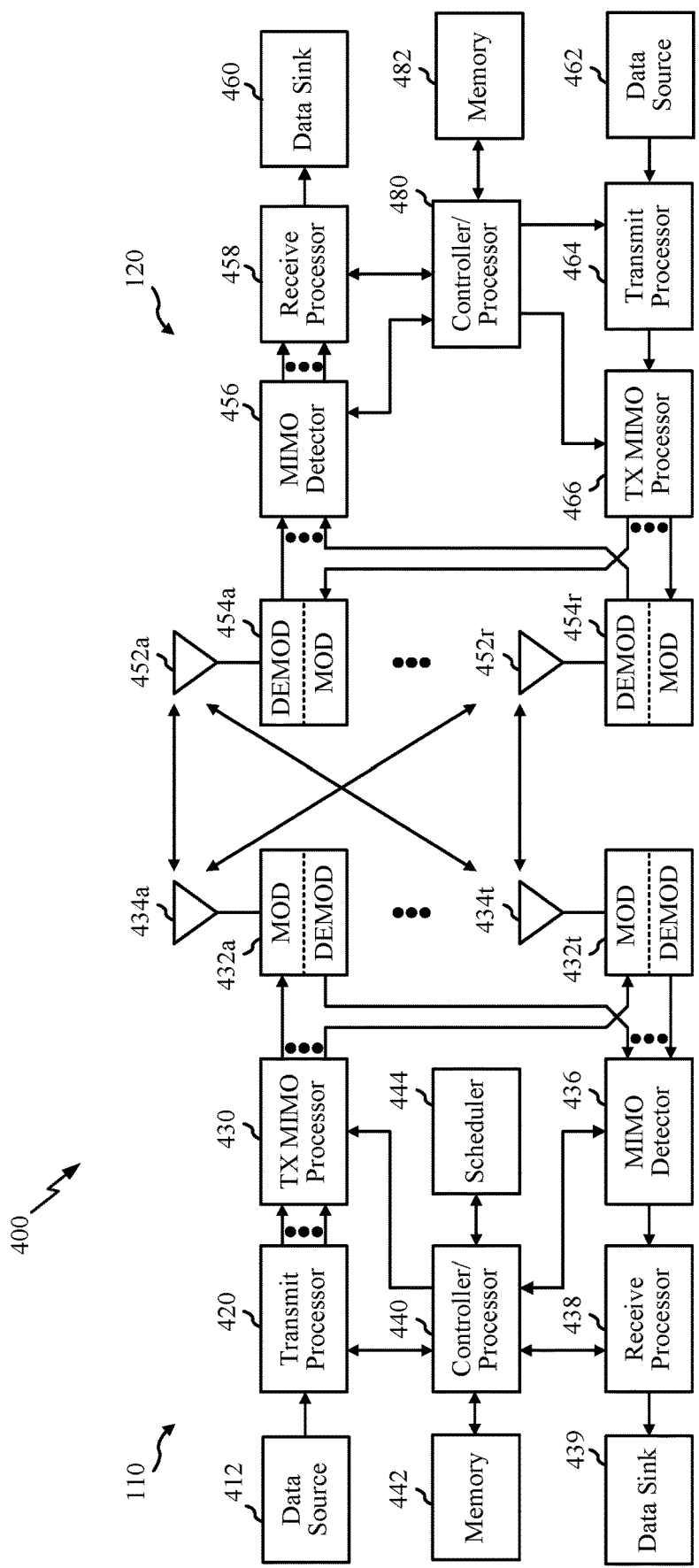
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may be configured to perform (or used by UE 120 to perform) operations 800 of FIG. 8. Similarly, antennas 434, processors 420, 460, 438, and/or controller/processor 440 of the BS 110 may be configured to perform (or used by BS 110 to perform) operations 900 of FIG. 9.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
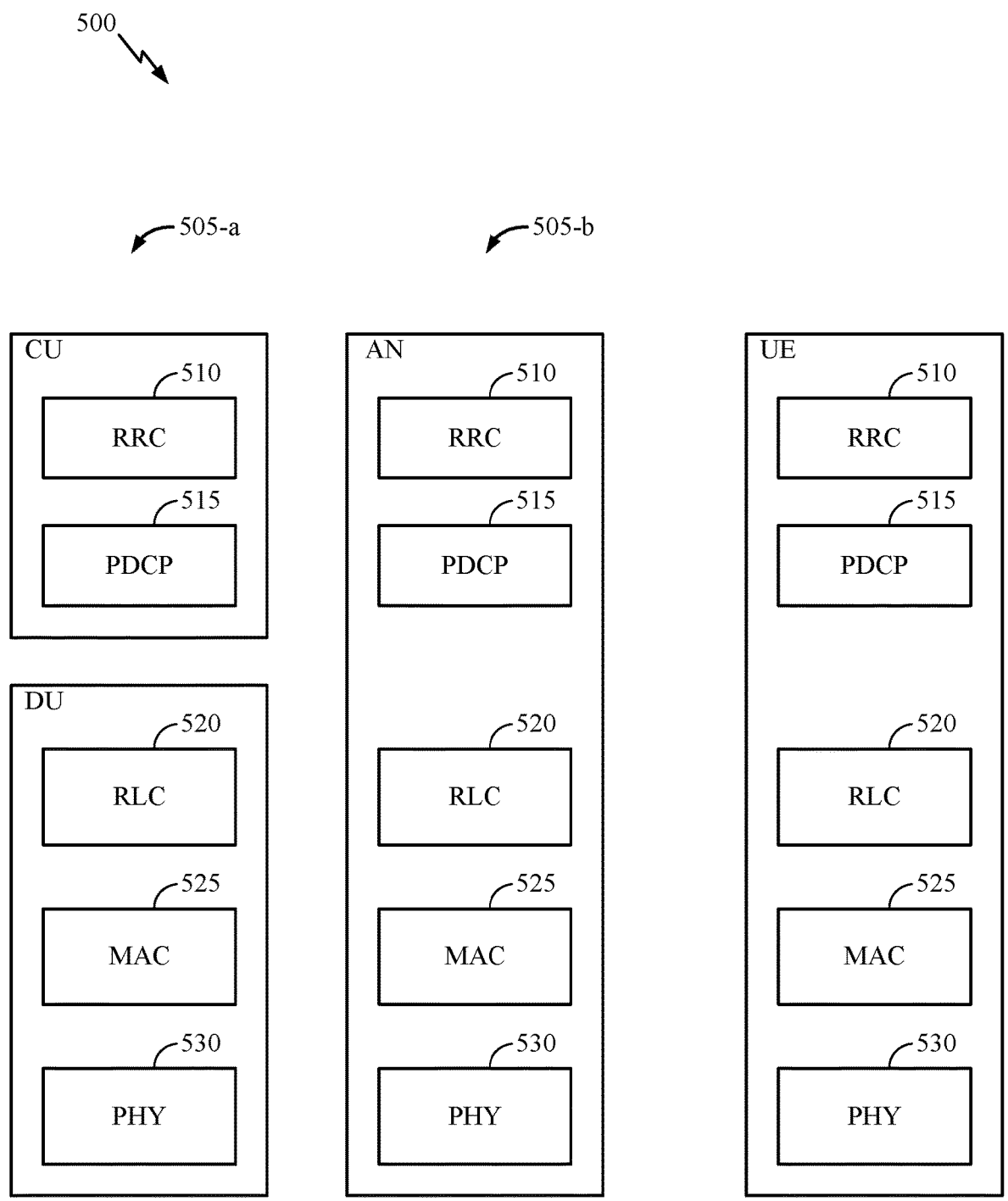
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
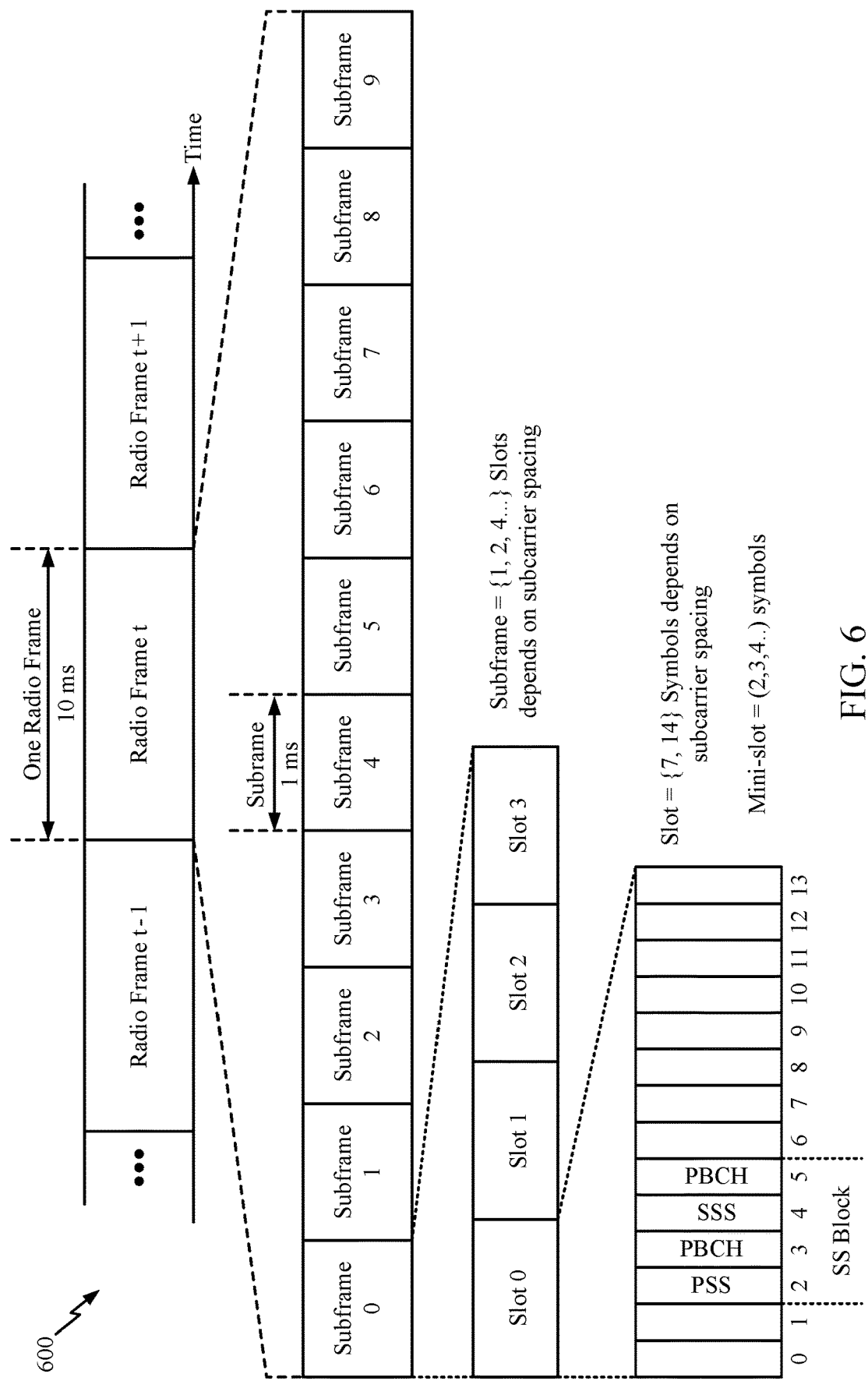
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal/physical broadcast channel (SS/PBCH) block is transmitted (also referred to as a synchronization signal block (SSB)). The SS/PBCH block includes a PSS, a SSS, and a two symbol PBCH. The SS/PBCH block can be transmitted in a fixed slot location, such as the symbols 2-5 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS/PBCH blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, Internet-of-Things communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example PUSCH Power Scaling to Enable Full Power Utilization at the UE

Aspects of the present disclosure provide techniques for scaling transmission power across transmit chains for physical uplink shared channel (PUSCH) transmissions.

As used herein, a transmit chain generally refers to a set of components in a signal path to take a baseband signal and generate an RF signal. Example transmit chain components include digital to analog converters (DACs), modulators, power amplifiers (PAs), as well as various filters and switches. Conversely, a receive chain generally refers to a set of components in a signal path to take an RF signal and generate a baseband signal. Example receive chain components include downconverts, demodulators, and analog to digital converters (ADCs), as well as various filters and switches.

For uplink data transmissions, according to a conventional PUSCH power scaling approach, a UE is assigned a single transmission (Tx) power budget that is to be split uniformly across all available transmit chains and the assigned RBs.

Unfortunately, there can be scenarios where the UE is unable to transmit at the full power when splitting the Tx power budget uniformly according to the conventional approach. For example, one such scenario is the case where a UE has four Tx chains, and is assigned the precoder [1 1 0 0]. If the UE is assigned a transmit power budget of $P_{\_PUSCH}$, then the UE is expected to scale transmission power according to a multi-step procedure such as the following 2-step algorithm:

(a) scale this power by the ratio of a number of antenna ports with a non-zero PUSCH transmission to a number of configured antenna ports, the (b) split the resulting scaled power equally across the antenna ports on which non-zero PUSCH is to be transmitted.

When the 2-step algorithm is followed as is, for the above example of four TX chains and a precoder [1 1 0 0], step (a) results in a scaled power of $P_{\_PUSCH}/2$ which, in step (b), is split equally among the two ports that carry non-zero PUSCH. Thus, two ports are assigned $P_{\_PUSCH}/4$ each, resulting is only half the Tx power budget being utilized.

Aspects of the present disclosure provide techniques that may help address this issue by providing new power allocation methods and signaling mechanisms. The techniques may help more efficiently utilize Tx power budget, particularly in UEs with transmit chains that have heterogeneous power amplifiers (PAs) and coherent/noncoherent antennas. As used herein, heterogeneous generally refers to PAs that have different output power ratings.

The following description assumes the following notation:
N refers to the number of configured antenna ports;
K refers to the number of antenna ports with non-zero PUSCH;
$P_{\_PUSCH}$ refers to the PUSCH transmission power budget;
P_a refers to the scaled transmission power obtained after Step (a); and
P_b refers to the power allocated to each port transmitting non-zero PUSCH after Step (b).

According to one proposed solution, a UE may be allowed to autonomously determine its own transmit power allocation. In this context, autonomous means the UE may allocate its Tx power budget as it sees fit, for example, without additional signaling from a base station.

In this case, a UE assigned a target $P_{\_PUSCH}$ may be allowed to split this power across multiple Tx chains as it decides, provided it preserves the integrity of any precoder assigned for PUSCH transmission. As used herein, integrity generally refers to the impact of power allocation being equivalent to scaling the precoders by a scalar value. In this case, with a UE allowed to autonomously determine power allocation, steps (a) and (b) of the 2-step algorithm described above may be ignored.

This autonomous approach may provide the UE with maximum flexibility in allocating the transmit power. This approach may be particularly beneficial to UEs with heterogeneous PAs in their transmit chains. As the base station is not likely to know output power ratings of the heterogeneous PAs, the UE is best positioned to determine the right allocation of power among the transmit chains, for example, by factoring in the individual output power rating of the PAs powering each transmit chain.

This autonomous approach may be considered an open loop scheme as it does not require additional signaling from the gNB (e.g., beyond the initial signaling of target $P_{\_PUSCH}$), which is in contrast to other techniques described below.

In other words, in these other techniques, a network entity (e.g., a gNB) may provide signaling to a UE that determines how the UE performs Tx power scaling.

In some cases, the Tx power scaling may be provided via a single bit (1-bit) signaling. For example, a gNB may provide a single bit that indicates whether the UE can skip part of the two-step algorithm described above. For example, the single bit may selectively turn on/off performing step (a) described above, while step (b) may always performed (regardless of the signaled bit value). The single bit may be provided, for example, via a grant that schedules a PUSCH or via some other type of signaling.

By skipping the initial scaling step (a), the entire Tx power budget may be assigned among the ports that transmit non-zero PUSCH.

The effect of this change may be demonstrated by considering the same example presented above, where a UE has four Tx chains, and is assigned the precoder [1 1 0 0]. In this example, if step (a) is disabled (the UE is allowed to skip this step), then each of two ports that transmit non-zero PUSCH are assigned $P_{\_PUSCH}/2$ power (rather than $P_{\_PUSCH}/4$ as per the conventional algorithm where the initial scaling is performed). Thus, in this example, the entire allocated Tx power budget is used.

Certain UEs may not be able to skip the scaling step even if allowed to, for example, depending on the output power rating of their power amplifiers. To address this case, some UEs may be configured to signal (e.g., an explicitly indication) of whether they can support this 1-bit signaling or not. This indication may be provided, for example, as UE capability information. As an alternative, UEs may be allowed to implicitly ignore this signaling and continue to perform both Step (a) and Step (b).

In some cases, the gNB may provide multi-bit signaling indicating how a UE is to perform transmit power scaling. For example, the gNB may provide multi-bit signaling for the UE to perform transmit power scaling according to a common power boosting. This alternative to the single-bit approach may provide a more fine grained approach to power allocation that can be enabled by adding a third step, a "Step (c)" to the first two steps already described above.

In this Step (c), the UE may be allowed to further alter the power as obtained from steps (a) and (b) via a common power boosting factor α. For example, assuming α is a 2-bit signaling parameter, a may indicate one of four values shown in FIG. 7. Thus, using 2-bits in this example, a gNB can enable boosting the power obtained after step (b) by one of four values (e.g., an additional 0, 1, 2, or 3 dB).

Figure 7:
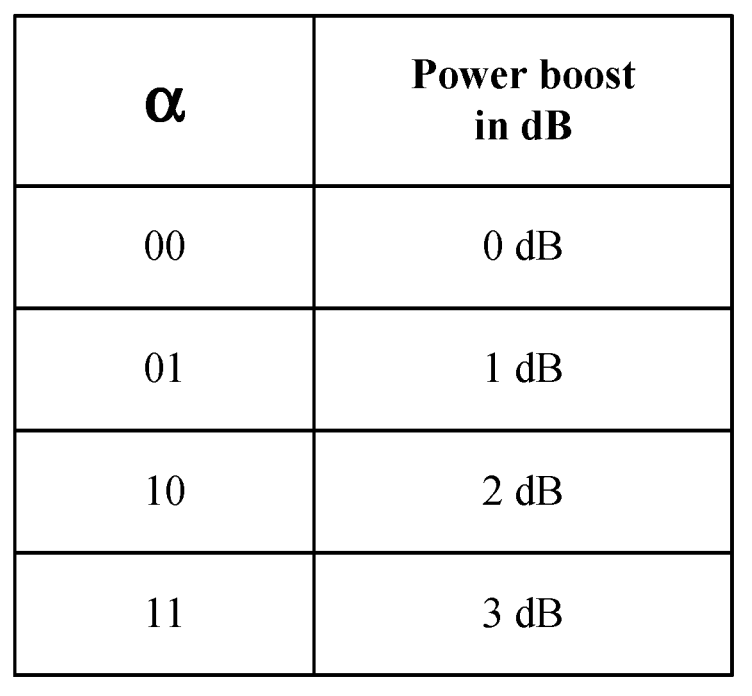

Power boosting in this manner may be described, assuming the same example as above, where a UE has 4 Tx chains, and is assigned the precoder [1 1 0 0]. In this example, steps (a) and (b) are followed by step (c) where α is indicated as '11.' In this case, using the alpha-power boost table as shown in FIG. 7, each port is allowed to boost its power by an additional 3 dB, such that the effective power per port is $P_{\_PUSCH}/2$. Thus, it is easy to see that once again the UE is able to use all available power using this method.

This result may be understood more easily by considering that the signaled α for Step (c) corresponds to a boost of $\beta_{\_dB}$ in dB scale or equivalently $\beta_{\_linear}$ in the linear scale. Thus, the new power assigned to each port is $P_{\_c}=P_{\_b} \times \beta_{\_linear}$. In the example above, a 3 dB corresponds to a 2× gain in the linear scale and, hence, a gain from $P_{\_PUSCH}/4$ to $P_{\_PUSCH}/2$.

Of course, the signaling of parameter a using 2-bits is an example only. In some cases, more than 2-bits may be used to achieve finer granularity.

In some cases, one or more actions may be taken (at the gNB and/or UE) to ensure that the power boosting in Step (c) does not end up exceeding an originally assigned power of $P_{\_PUSCH}$. For example, such actions may include:
(1) Preventing such cases altogether. For example, only those values of α that ensure the total assigned power across the ports does not exceed $P_{\_PUSCH}$ may be considered valid or permitted. Signaling by the gNB may ensure the power allocation is valid, so that such cases do not arise (e.g., a gNB may consider the impact of the signaled boost and only signal valid values);
(2) Step (c) may be ignored for cases where the power boosting would result in $P_{\_PUSCH}$ being exceeded. In this case, $\beta_{\_line}$ may effectively default to 1;
(3) As an alternative to the above, if the total power constraint is violated ($P_{\_b} \times \beta_{\_linear} \times K \geq P_{\_PUSCH}$), then $P_{\_c}$ can be set as:

$$P_{\_c}=\min(P_{\_b} \times \beta_{\_linear}, P_{\_PUSCH}/K)$$

These fallback mechanisms allow decoupling of the signaling of the precoder and the common power boosting factor. This may help simplify signaling, as a common power boosting factor can be indicated once, and used across several precoders, with K reflecting the number of ports with non-zero PUSCH for each signaled precoder.

In the preceding discussion, it may be important that the power P_c assigned to a port with non-zero PUSCH transmission does not exceed the maximum output power rating of the power amplifier on that antenna port. To avoid such a scenario, the UE may signal/report its (RF) capability to the eNB. This signaling may indicate, for example, a maximum common power boost supported by the UE.

In some cases, as an extension to signaling a multi-bit power boost parameter as described above, the power boosting factor can be specified on a per-port basis (i.e., $\alpha_1$, $\alpha_2$, ..., $\alpha_N$ assuming N ports). This approach may allow even greater flexibility in how each port is assigned a transmit power.

This per-port method may be described by assuming an example where P_b is the power assigned per port after steps (a) and (b) and the signaled $\alpha_i$ for Step (c) corresponds to a boost of $\beta_{\_(i,dB)}$ in dB scale or equivalently $\beta_{\_(i,linear)}$. In the linear scale, then, the new power assigned to the $i^{th}$ port according to this approach is:

$$P_{\_(c,i)}=P_{\_b} \times \beta_{\_(i,linear)}.$$

In some cases, the bit-width of each $\alpha_i$ may be different.

If the ports with non-zero PUSCH are known apriori, then it suffices to only signal values of $\alpha_i$ for the ports with non-zero PUSCH (although additional signaling may be required if/when the precoder changes). Alternatively, the per-port power boosting values (corresponding to different precoding) can be signaled once for all the antenna ports and used across several transmission even when precoding changes.

Similar to the single value case above, steps may be taken in the "per-port" case to ensure that the power boosting in Step (c) does not exceed the original assigned power of $P_{\_PUSCH}$. In other words, these steps may be taken to ensure that:

$$\Sigma_{n=1}^{N} P_b \beta_{n,linear} \leq P_{PUSCH}.$$

For example, such actions may include:
(1) Preventing such cases altogether. For example, only those values of α is that ensure the total assigned power across the ports does not exceed P_PUSCH may be considered valid or permitted. Signaling by the gNB may ensure the power allocation is valid, so that such cases do not arise;
(2) Step (c) may be ignored for such cases, effectively meaning $\beta_n$, linear defaults to 1 for all ports;

(3) Alternately, if the total power constraint is violated, meaning:

$$\sum_{n=1}^{N} P_b \beta_{n,linear} \geq P_{PUSCH},$$

then P_c,i can be set as P_PUSCH/K for all ports that transmit non-zero PUSCH.

These fallback mechanisms effectively allow decoupling the signaling of the precoder and the per-port power boosting factors. Per-port power boosting factors can be indicated once, and used across several precoders, with K reflecting the number of ports with non-zero PUSCH for each signaled precoder. In the preceding discussion, it may be important that the power P_c,i assigned to a port with non-zero PUSCH transmission does not exceed the maximum output power rating of the power amplifier on that antenna port. To avoid such a scenario, the UE may signal/report RF capability to eNB on the maximum per-port power boost supported by the UE.

Aspects of the present disclosure also provide various additional features that may be considered enhancements for cases where a UE is allowed to determine power allocation for a PUSCH transmission. The enhancements may be applicable, for example, to any power allocation scheme where a UE is provided with some level of autonomy or when the UE implementation is not known to gNB.

In some such cases, a value indicated (by a UE) in a power headroom report (PHR) accompanying the PUSCH transmission may be dependent on a transmit precoding matrix indicator (TPMI) used for the PUSCH transmission. In general, each TPMI may have a different PHR value, for example, due to different characteristics in the power amplifiers used in the different transmit chains associated with the different TPMIs.

Because of this, when a UE is allowed to determine power allocation autonomously, the actual transmit power used by the UE can be TPMI-dependent. In other words, a PHR based on a slot with a PUSCH transmission may also be dependent on the exact TPMI used in that slot. This may be illustrated by considering an example of a UE with 2 antenna ports:

(1) a first port having a 20 dBm PA; and
(2) a second port having a 23 dBm PA.

Assuming the UE is asked to transmit at 17 dBm power then, for a TPMI corresponding to the precoder [1, 0], which selects the first port, the PHR should indicate a headroom of 3 dB (20 dBm−17 dBm). On the other hand, if the TPMI corresponds to the precoder [0 1], selecting the second port, the PHR should indicate a headroom of 6 dB (23 dBm−17 dBm).

For this reason, the PHR that accompanies the PUSCH transmission should indicate the appropriate value for the TPMI used in that slot. In some cases, it may not be necessary to explicitly tag (or signal) the exact TPMI, as the gNB may already know the TPMI used, so it can track this on its end.

Given the PHR signaled in this example is for a particular TPMI, it may be important that the UE keep its implementation/configuration consistent over a certain period of time. For example, it may be desirable that the UE avoid dynamically switching the port to Tx-chain mapping too frequently (every slot).

As noted above, in some cases, a gNB may provide one or more bits of signaling to indicate whether a UE is to allocate power in a manner different from a conventional approach (e.g., what is currently specified in a standard). In some cases, however, a UE may not be allowed to deviate from what is specified (e.g., a UE may not be able to skip a power scaling step). Therefore, it may be desirable for a UE to indicate support for this feature (e.g., during call setup) as noted above.

Further, in some cases, whether a UE supports this particular feature (or similar features) may depend on one or more band combinations supported by the UE for carrier aggregation (CA).

For example, if there are three component carriers (cc1, cc2 and cc3), the UE may support combinations cc1+cc3 and cc2+cc3. Thus, in addition to indicating support for these band combinations in general, the UE may also indicate, for each supported band combination, whether a change to the power allocation rule is supported or not.

In some cases, the UE may provide a pair of bits the values of which indicate whether or not the UE supports a new power allocation rule for each of the band combinations supported. For example, assuming the bit combinations from the example above, if the UE supports a new rule for the cc1+cc3 combination, but not for the cc2+cc3 combination, then the UE may signal the following pairs: [Cc1+cc3, b=1] and [cc2+cc3, b=0], where bit b is used to indicate support for the new power allocation rule.

Using the techniques described above, a UE may be allowed to split assigned target transmit power P_PUSCH across multiple transmit chains as it sees fit, while preserving the integrity of any precoder that may be assigned for PUSCH transmission. In this context, the term integrity means the impact of power allocation is equivalent to scaling the precoders by a scalar.

As noted above, these techniques may be particularly beneficial to a UE with heterogeneous PA, since the UE is best positioned to determine the right allocation of power among the transmit chains by factoring in the individual output power rating of the PAs powering each transmit chain. The techniques may be considered a relatively straightforward open loop scheme that may be implemented without additional signaling from the gNB.

Example Reporting of PUSCH Power Scaling Factor in the Power Headroom Report (PHR)

Allowing a UE to allocate transmit power across multiple transmit chains, as described herein, may result in a one-to-one mapping between TPMIs and values reported in power headroom reports (PHRs). In this manner, PHR values may now be considered as dependent on TPMI. As such, it may be beneficial for a gNB to have a mapping between received PHR values and the TPMIs used for the corresponding PUSCH transmission (and on which the value in the PHR is based).

In other words, when a UE is allowed to determine power allocation autonomously, the actual transmit power used by the UE can be TPMI dependent. As such, a power headroom report (PHR) based on a slot with PUSCH transmission is now also dependent on the particular TPMI used in that slot. It may be noted that a PHR report is typically based on a single slot that has a PUSCH.

The TPMI dependent PHR is illustrated with reference to the example described above, considering a UE with 2 antenna ports, with the first port having a 20 dBm PA, the second port having a 23 dBm PA, and the UE asked to transmit at 17 dBm power. For a TPMI corresponding to the precoder [1, 0], the PHR should indicate a headroom of 3 dB (20 dBm−17 dBm), but if the TPMI corresponds to the precoder [0 1], the PHR should indicate a headroom of 6 dB (23 dBm−17 dBm).

Due to this TPMI dependency, it may be important that the power headroom report (PHR) that accompanies a PUSCH transmission gets associated with (or tagged with) the particular TPMI used in that slot. As the gNB knows the TPMI used, it may not be necessary for the UE to explicitly tag or signal the TPMI (just that it knows the association). On the UE side, it may be important that the UE keep its antenna port and Tx-chain (PA) implementation/configuration consistent over a certain period of time, as there may be limits on how frequently the UE is able to dynamically switch port to Tx-chain mapping.

For these reasons, the use of UE-determined power scaling factors may present certain challenges for the gNB to figure out the exact power allocation used by the UE. This uncertainty may make it difficult for the gNB to make the right decisions for link adaptation, to determine the appropriate MCS, TPMI, and the like.

Aspects of the present disclosure, however, provide techniques that may help a gNB make a more informed decision by signaling an indication of the power scaling factors used. As will be described in greater detail below, in some cases, the indication of the power scaling factors used may be embedded in a corresponding PHR.

Figure 8:
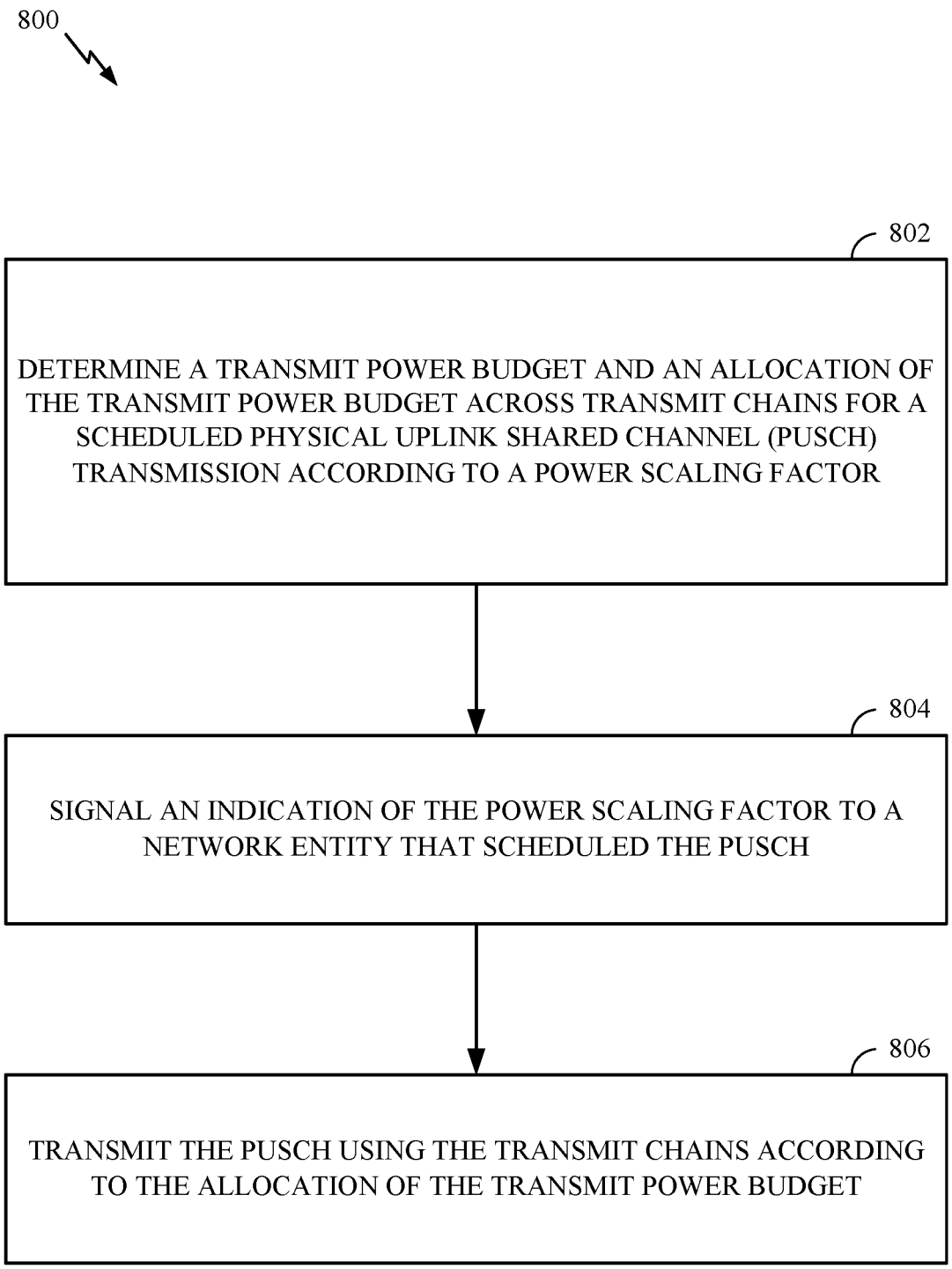
FIG. 8 illustrates example operations that may be performed by a user equipment (UE), in accordance with aspects of the present disclosure.

FIG. 8 illustrates example operations 800 for autonomous scaling transmission power of PUSCH transmissions by a user equipment (UE), in accordance with aspects of the present disclosure. For example, operations 800 may be performed by a UE 120 shown in FIGS. 1 and 4.

Operations 800 begin, at 802, by determining a transmit power budget and an allocation of the transmit power budget across transmit chains for a scheduled physical uplink shared channel (PUSCH) transmission according to a power scaling factor. At 804, the UE signals an indication of the power scaling factor to a network entity that scheduled the PUSCH. At 806, the UE transmits the PUSCH using the transmit chains according to the allocation of the transmit power budget.

In some cases, the indication of the power scaling factor used for a particular PUSCH transmission may be included in a PHR. As noted above, a PHR is typically associated with PUSCH transmission in a particular slot. The TPMI used in this slot is known to the gNB (as the gNB signals this TPMI to the UE). This TPMI, along with the power $P_{PUSCH}$, may allow the UE to determine an appropriate scale factor $\alpha$.

Techniques proposed herein provide an indication of this scaling factor $\alpha$ as an additional field in the PHR. A gNB may use this information regarding the scaling factors used for different PUSCH transmissions with different TPMIs to optimize subsequent scheduled transmissions. For example, the gNB may consider which TPMIs result in greater scaling and schedule accordingly (and use TPMIs that enable full power transmissions at the UE).

Figure 9:
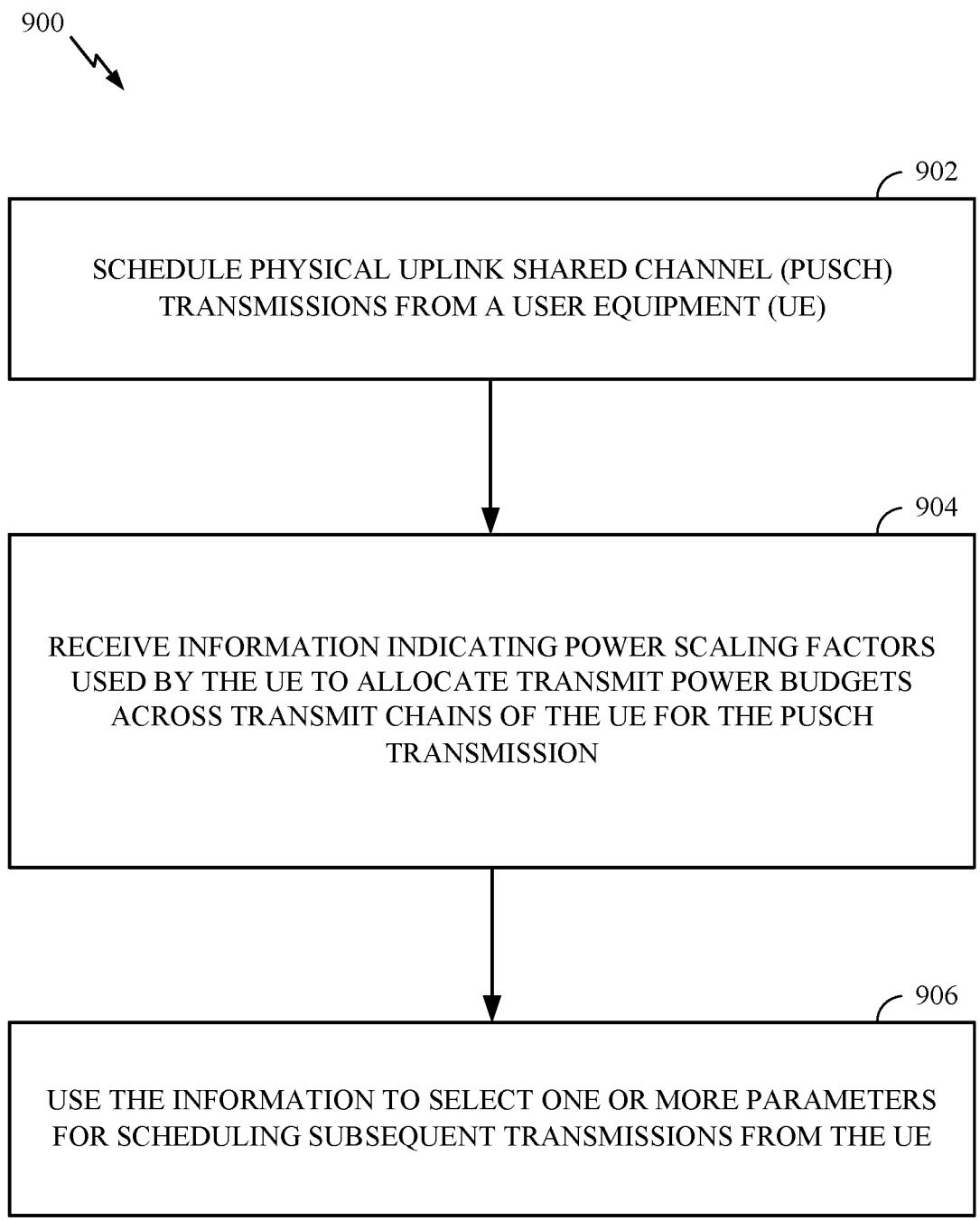
FIG. 9 illustrates example operations that may be performed by a network entity, in accordance with aspects of the present disclosure.

FIG. 9 illustrates example operations 900 by a network entity, such as an eNB/gNB, to use information regarding scaling factors, in accordance with aspects of the present disclosure. For example, operations 900 may be performed by a BS/gNB 110 shown in FIGS. 1 and 4 to receive signaling of power scaling factors from a UE performing operations 700 of FIG. 7 described above.

Operations 900 begin, at 902, by scheduling a physical uplink shared channel (PUSCH) transmissions from a user equipment (UE). At 904, the network entity receives information indicating power scaling factors used by the UE to allocate transmit power budgets across transmit chains of the UE for the PUSCH transmission. At 906, the network entity uses the information to select one or more parameters for scheduling subsequent transmissions from the UE.

As indicated above, the information regarding the scaling factor may be provided via PHRs. Based on this information regarding the scaling factors used for different PUSCH transmissions, the gNB can then learn the scale factors associated with particular TPMIs. Over time, the gNB may learn the TPMIs that enable full power transmissions at the UE.

In this manner, providing information regarding the scaling factor used by a UE may allow a gNB to know which TPMIs lead to higher transmit powers at the UE. In some cases, this information may allow a gNB to select more appropriate MCS values for a given TPMI, since the corresponding scaling factor is now known. In general, the techniques presented herein may allow a gNB to better harness the UE capabilities (that may be advertised).

For these reasons, signaling information regarding scaling factors used by a UE to allocate transmit power across transmit chains for PUSCH transmissions may allow better link adaptation which may, in turn, lead to more robust network performance.

There are various options for the particular format for reporting the power scale factor (e.g., in the PHR). For example, in some cases, the power scaling factor $\alpha$ may be assumed to be a linear value chosen by the UE within a certain range, such that:

$$\alpha_{min} \leq \alpha \leq \alpha_{max},$$

where values for the minimum and maximum power scaling factors $\alpha_{min}$ and $\alpha_{max}$ may be known to both the UE and gNB. In some cases, $\alpha_{max}$ may be a fixed value (e.g., fixed at 1), while the value for $\alpha_{min}$ may be computed using conventional techniques (e.g., as if a UE were not allowed to perform the techniques described herein).

In some cases, K bits of a field in a PHR may be assigned to represent the power scaling factor $\alpha$. The particular values of the K bits may depend on a particular quantization approach used. For example, given a range for $\alpha$, $2^K$ bins (with a bin referring to a set of values) may be created within the range described above (between $\alpha_{min}$ and $\alpha_{max}$) to quantize $\alpha$. The bin corresponding to a given value of a may be identified and the UE may provide the index of this bin as a new field in the PHR.

Quantization can be carried out in either the linear domain or the dB domain. For example, for linear domain quantization, the range $[\alpha_{min}, \alpha_{max}]$ may be uniformly divided into $2^K$ bins. The bin corresponding to a given $\alpha$ is identified and its index may then be signaled by the UE (e.g., included in the PHR).

For dB (logarithmic) domain quantization, the following equations may be used:

$$\alpha_{dB} = 10 * \log_{10} \alpha,$$

$$\alpha_{min,dB} = 10 * \log_{10} \alpha_{min}, \text{ and}$$

$$\alpha_{max,dB} = 10 * \log_{10} \alpha_{max} \text{ (e.g. } \alpha_{max,dB} = 0 \text{ for } \alpha_{max} = 1\text{).}$$

In this case, the range $[\alpha_{min,dB}, \alpha_{max,dB}]$ may be uniformly divided into $2^K$ bins. The bin corresponding to a given $\alpha_{dB}$ may then be identified and its index may then be signaled (e.g., included in the PHR).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 7 and 8 may be performed by various processors shown in FIG. 4. More particularly, operations 700 of FIG. 7 may be performed by one or more of processors 466, 458, 464, and/or controller/processor 480 of the UE 120, while operations 800 of FIG. 8 may be performed by processors 420, 460, 438, and/or controller/processor 440 of the BS 110 shown in FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7 and 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communications by a user equipment (UE), comprising:
   determining a transmit power budget and an allocation of the transmit power budget across transmit chains for a scheduled physical uplink shared channel (PUSCH) transmission according to a plurality of power scaling factors;
   transmitting, to a network entity that scheduled the PUSCH, a power headroom report (PHR) including the plurality of power scaling factors; and
   transmitting the PUSCH using the transmit chains according to the allocation of the transmit power budget.

2. The method of claim 1, wherein the UE determines each power scaling factor in the plurality of power scaling factors based on a respective transmit precoding matrix indicator (TPMI) and the transmit power budget.

3. The method of claim 1, wherein each power scaling factor in the plurality of power scaling factors is defined within a range.

4. The method of claim 3, wherein the range is defined by a minimum value at a low end and a maximum value at a high end.

5. The method of claim 3, wherein:
   each power scaling factor of the plurality of power scaling factors is indicated in the PHR using a respective set of K bits; and
   each respective set of K bits represents an index to a bin of power scaling factor values within the range.

6. The method of claim 5, wherein:
   the bins are uniformly divided within the range; and
   the bins are quantized in a linear domain.

7. The method of claim 5, wherein:
   the bins are uniformly divided within the range; and
   the bins are quantized in a logarithmic domain.

8. The method of claim 1, further comprising:
   receiving signaling, from the network entity, indicating how to allocate the transmit power budget across the transmit chains for the PUSCH transmission.

9. The method of claim 8, wherein:
   the signaling indicates whether or not the UE can skip at least one step of a multi-step procedure for allocating the transmit power budget across transmit chains.

10. The method of claim 9, further comprising providing signaling to the network entity indicating whether the UE supports skipping the at least one step.

11. A method of wireless communications by a network entity, comprising:
    scheduling physical uplink shared channel (PUSCH) transmissions from a user equipment (UE);
    receiving a power headroom report (PHR) including a plurality of power scaling factors used by the UE to allocate transmit power budgets across transmit chains of the UE for the PUSCH transmission; and
    using the plurality of power scaling factors to select one or more parameters for scheduling subsequent transmissions from the UE.

12. The method of claim 11, wherein each power scaling factor in the plurality of power scaling factors is defined within a range.

13. The method of claim 12, wherein the range is defined by a minimum value at a low end and a maximum value at a high end.

14. The method of claim 12, wherein:
    each power scaling factor of the plurality of power scaling factors is indicated in the PHR using a respective set of K bits; and each respective set of K bits represents an index to a bin of power scaling factor values within the range.

15. The method of claim 14, wherein:
the bins are uniformly divided within the range; and
the bins are quantized in a linear domain.

16. The method of claim 14, wherein:
the bins are uniformly divided within the range; and
the bins are quantized in a logarithmic domain.

17. The method of claim 11, wherein using the plurality of power scaling factors to select one or more parameters for scheduling subsequent transmissions from the UE comprises:
associating each power scaling factor in the plurality of power scaling factors with a respective transmit precoding matrix indicator (TMPI); and
selecting one or more of the respective TPMIs for the subsequent transmissions that enable higher power transmissions from the UE than one or more other TPMIs.

18. The method of claim 11, wherein using the plurality of power scaling factors to select one or more parameters for scheduling subsequent transmissions from the UE comprises:
selecting one or more modulation and coding scheme (MCS) values for a given transmit precoding matrix indicator (TPMI) based on the plurality of power scaling factors.

19. The method of claim 11, wherein using the power scaling factors to select one or more parameters for scheduling subsequent transmissions from the UE comprises:
using the plurality of power scaling factors to select one or more parameters for performing link adaptation.

20. The method of claim 11, further comprising:
signaling, to the UE, an indication of how to non uniformly allocate the transmit power budgets across the transmit chains for the PUSCH transmissions.

21. The method of claim 20, wherein:
the signaling indicates whether or not the UE can skip at least one step of a multi-step procedure for allocating the transmit power budgets across the transmit chains.

22. An apparatus for wireless communications by a user equipment (UE), comprising:
at least one processor configured to determine a transmit power budget and an allocation of the transmit power budget across transmit chains for a scheduled physical uplink shared channel (PUSCH) transmission according to a plurality of power scaling factors; and
a transmitter configured to:
transmit, to a network entity that scheduled the PUSCH, a power headroom report (PHR) including the plurality of power scaling factors; and
transmit the PUSCH using the transmit chains according to the non uniform allocation of the transmit power budget.

23. The apparatus of claim 22, wherein the UE determines each power scaling factor in the plurality of power scaling factors based on a respective transmit precoding matrix indicator (TPMI) and the transmit power budget.

24. The apparatus of claim 22, wherein each power scaling factor in the plurality of power scaling factors is defined within a range.

25. The apparatus of claim 24, wherein the range is defined by a minimum value at a low end and a maximum value at a high end.

26. The apparatus of claim 24, wherein:
each power scaling factor of the plurality of power scaling factors is indicated in the PHR using a respective set of K bits; and
each respective set of K bits represents an index to a bin of power scaling factor values within the range.

27. An apparatus for wireless communications by a network entity, comprising:
at least one processor configured to schedule a physical uplink shared channel (PUSCH) transmission from a user equipment (UE); and
a receiver configured to receive a power headroom report (PHR) including a plurality of power scaling factors used by the UE to allocate transmit power budgets across transmit chains of the UE for the PUSCH transmission, wherein the at least one processor is further configured to use the plurality of power scaling factors to select one or more parameters for scheduling subsequent transmissions from the UE.

28. The apparatus of claim 27, wherein, in order to use the plurality of power scaling factors to select one or more parameters for scheduling subsequent transmissions from the UE, the at least one processor is further configured to:
associate each power scaling factor in the plurality of power scaling factors with a respective transmit precoding matrix indicator (TMPI); and
select one or more of the respective TPMIs for the subsequent transmissions that enable higher power transmissions from the UE than one or more other TPMIs.

29. The apparatus of claim 27, wherein, in order to use the plurality of power scaling factors to select one or more parameters for scheduling subsequent transmissions from the UE, the at least one processor is further configured to:
select one or more modulation and coding scheme (MCS) values for a given transmit precoding matrix indicator (TPMI) based on the plurality of power scaling factors.

30. The apparatus of claim 27, wherein, in order to use the plurality of power scaling factors to select one or more parameters for scheduling subsequent transmissions from the UE, the at least one processor is further configured to:
use the plurality of power scaling factors to select one or more parameters for performing link adaptation.

* * * * *